US012624673B2

(12) United States Patent
Zhou et al.

(10) Patent No.: US 12,624,673 B2
(45) Date of Patent: May 12, 2026

(54) AMMONIA-FUELED ENGINE BASED ON OXYGEN ENHANCEMENT AND AMMONIA-RICH COMBUSTION CONTROL METHOD THEREOF

(71) Applicant: Tianjin University, Tianjin (CN)

(72) Inventors: Lei Zhou, Tianjin (CN); Zongkuan Liu, Tianjin (CN); Lijia Zhong, Tianjin (CN); Haiqiao Wei, Tianjin (CN); Gequn Shu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/965,679

(22) Filed: Dec. 2, 2024

(65) Prior Publication Data

US 2025/0305471 A1 Oct. 2, 2025

(30) Foreign Application Priority Data

Mar. 27, 2024 (CN) ......................... 202410360234.0

(51) Int. Cl.
*F02M 21/02* (2006.01)
*F02M 21/04* (2006.01)

(52) U.S. Cl.
CPC .... *F02M 21/0206* (2013.01); *F02M 21/0248* (2013.01); *F02M 21/04* (2013.01)

(58) Field of Classification Search
CPC ........... F02M 21/0206; F02M 21/0248; F02M 21/0275; F02M 21/04; F02D 19/021; F02D 41/0027; F02D 41/0002; F02D 41/3017; F02P 23/04; F02B 19/1085; F02B 19/12; Y02T 10/12; Y02T 10/30
See application file for complete search history.

(56) References Cited

U.S. PATENT DOCUMENTS

| | | | | |
|---|---|---|---|---|
| 11,542,878 B2 * | 1/2023 | Heggen | F02B 19/108 | |
| 12,480,453 B2 * | 11/2025 | Zhou | F02D 41/0002 | |
| 2011/0265463 A1 * | 11/2011 | Kojima | F02M 21/0278 | 123/297 |
| 2015/0260131 A1 * | 9/2015 | Riley | F02B 47/06 | 123/542 |

* cited by examiner

*Primary Examiner* — Grant Moubry
*Assistant Examiner* — James G Moubry
(74) *Attorney, Agent, or Firm* — Thomas Horstemeyer, LLP

(57) ABSTRACT

An ammonia-fueled engine based on oxygen enhancement and reactive activity control, and an ammonia-rich combustion control method thereof are provided. The ammonia-fueled engine based on oxygen enhancement includes a jet ignition device and an ammonia gas injector. An oxygen injector is provided on the jet ignition device. During the operation of the ammonia-fueled engine, the ammonia gas injector firstly injects ammonia fuel into a combustion chamber, and ammonia gas in the combustion chamber enters a prechamber inner cavity through a jet hole during a compression stroke, and the oxygen injector firstly injects oxygen gas into a prechamber to reduce an ammonia concentration in a gas mixture in the prechamber, dilute the gas mixture in the prechamber, improve the reaction activity of the gas mixture, and ensure the speed and intensity of an initial flame; and then a jet flame is formed to ignite over-concentrated ammonia-air mixture in the combustion chamber.

6 Claims, 3 Drawing Sheets

AMMONIA-FUELED ENGINE BASED ON OXYGEN ENHANCEMENT AND AMMONIA-RICH COMBUSTION CONTROL METHOD THEREOF

CROSS-REFERENCE TO RELATED APPLICATION

This patent application claims the benefit and priority of Chinese Patent Application No. 202410360234.0 filed with the China National Intellectual Property Administration on Mar. 27, 2024, the disclosure of which is incorporated by reference herein in its entirety as part of the present application.

TECHNICAL FIELD

The present disclosure belongs to the technical field of internal combustion engines, and in particular to an ammonia-fueled engine based on oxygen enhancement and reaction activity control, and an ammonia-rich combustion control method thereof.

BACKGROUND

In the application of traditional fossil fuels, ammonia ($NH_3$), a burning alternative fuel, is a promising and feasible carbon emission reduction technological path. However, there are two key challenges in ammonia combustion: firstly, the ammonia is poor in combustion characteristics, and is difficult in ignition and stable combustion under conventional conditions. Secondly, because of its high nitrogen content, there is a risk of high NOx emission in ammonia combustion. The implementation of the engineering application of ammonia combustion needs the full understanding of the characteristics of ammonia combustion and NOx emission, and targeted research on combustion enhancement and NOx control measures.

In recent years, researchers have carried out in-depth research on ammonia combustion, trying to explore economic, simple and efficient ammonia combustion enhancement measures and NOx emission control strategies, and have achieved a lot of valuable research results. The ammonia combustion enhancement mainly starts from the aspects of fuel side improvement, oxidant side adjustment and combustion conditions improvement, etc., and the enhancement measures mainly include blended burning, partial precalcining combustion, oxygen-enriched combustion, preheating combustion and enhanced mixing. The NOx in ammonia combustion mainly comes from the nitrogen contained in the fuel itself, so the NOx control strategies mainly start with controlling the oxidation conditions of ammonia, and air classification is one of the most effective methods. Meanwhile, ammonia itself is also an efficient NOx reducing agent, and making full use of such characteristics, reasonable configuration of mixed strategies according to the combustion temperature conditions is also conducive to the effective control of NOx. However, the ammonia, when used as engine fuel, is poor in the combustion characteristics, such as high spontaneous combustion temperature, slow flame propagation speed and narrow combustible range, leading to unstable combustion, low efficiency and poor performance of the ammonia-fueled engine. In addition, when the in-cylinder combustion status is poor, the engine also faces the risk of increased nitrogen oxide emission and ammonia escape. Therefore, the development of an efficient and clean combustion mode is a big challenge for ammonia-fueled engine.

SUMMARY

In the prior art, it is found that injecting high-activity fuel (such as hydrogen) into the prechamber still cannot break through the limit of EGR (exhaust gas recirculation). The present disclosure provides an ammonia-fueled engine based on oxygen enhancement and reaction activity control, and an ammonia-rich combustion control method thereof. From the perspective of changing oxygen gas in the prechamber, efficient combustion is achieved, the limit of lean combustion is expanded, and stable ignition and combustion are achieved.

An objective of the present disclosure is achieved through the following technical solution:

An ammonia-fueled engine based on oxygen enhancement includes a jet ignition device, a piston, a cylinder head, a cylinder liner, and an ammonia gas injector. A combustion chamber is formed between the piston and the cylinder head, and an end of the jet ignition device and an end of the ammonia gas injector extend into the combustion chamber. The jet ignition device includes a prechamber inner cavity, a spark plug, an oxygen injector, and a fuel injector. The spark plug is located in the prechamber inner cavity, and injection ports of the oxygen injector and the fuel injector extend into the prechamber inner cavity. The oxygen injector is configured to inject oxygen gas into the prechamber inner cavity to reduce a concentration of a gas mixture in the prechamber inner cavity.

An ammonia-rich combustion control method of the ammonia-fueled engine based on oxygen enhancement includes the following steps:

- during operation of an ammonia-fueled engine, injecting, by an ammonia gas injector, ammonia fuel into a combustion chamber to form a concentrated ammonia-air mixture with an equivalence ratio of 1.0-1.2 in the combustion chamber;
- during a compression stroke, due to the compression of a piston, enabling ammonia gas in the combustion chamber to enter a prechamber inner cavity through a jet hole;
- before a spark plug ignites, injecting, by an oxygen injector, oxygen gas into the prechamber inner cavity to reduce an ammonia concentration in a gas mixture in the prechamber inner cavity; and
- at a position close to compression top dead center, igniting, by the spark plug, the gas mixture in the prechamber inner cavity to form a jet flame through the jet hole, and then igniting a concentrated ammonia-air mixture in the combustion chamber to complete combustion work of an engine.

Further, the jet ignition device includes a shell and a prechamber front end. The shell and the prechamber front end are in detachable connection, and a cavity formed between a bottom of the shell and an inner wall of the prechamber front end is the prechamber inner cavity. A jet hole is provided on the bottom of the prechamber front end, communicating the prechamber inner cavity with the combustion chamber, and threads are provided on partial outer wall of the prechamber front end for threaded connection to the cylinder head of an engine.

Further, oxygen injection quantity of the oxygen injector is determined according to an operating condition of the engine, so as to generate prechamber jet flames with different intensities.

Further, ammonia injection quantity of the ammonia gas injector is regulated and controlled by an ECU (electronic control unit) of the engine, and a thermodynamic environment with a fuel-air equivalence ratio greater than 1 is achieved in the combustion chamber.

Further, the volume and structure of the prechamber inner cavity, a diameter and amount of the jet hole are selected according to an engine type and the operating condition.

Compared with the prior art, the technical solution of the present disclosure has beneficial effects as follows:

The jet temperature and jet speed of the prechamber are improved by injecting oxygen gas into the prechamber, and the reaction activity and jet intensity of the prechamber are flexibly adjustable by combining a detachable prechamber front end structure. The traditional active prechamber technology changes high-speed jet ignition by only changing the fuel type, but in the present disclosure, the gas mixture in the prechamber is diluted from the perspective of changing the oxygen gas in the prechamber, meanwhile, the reaction activity of the gas mixture is improved, and efficient combustion is ultimately achieved. The combustion limit of an ultra-thin combustion engine is expanded in a way of injecting oxygen gas into the prechamber, and the ignition energy and combustion stability are improved. The present disclosure is especially effective for the ammonia-fueled engine.

1—piston; 2—combustion chamber; 3—intake valve; 4—jet ignition device; 5—ammonia gas injector; 6—exhaust valve; 7—cylinder head; 8—cylinder liner; 9—spark plug; 10—shell; 11—oxygen injector; 12—fuel injector; 13—prechamber inner cavity; 14—jet hole; 15—prechamber front end.

DETAILED DESCRIPTION OF THE EMBODIMENTS

To make the objectives, technical solutions, beneficial effects and remarkable developments of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

In the present disclosure, it should be noted that, unless expressly specified and limited otherwise, the terms "first", "second" and "third" are used for descriptive purposes only and cannot be construed as indicating or implying relative importance. The term "a plurality of" refers to two or more. Unless otherwise specified or specified, the terms "connection" and "fixed" should be broadly understood. For example, "connection" may be a fixed connection, a detachable connection, an integral connection, or an electrical connection, and "connection" may also be direct connection, or indirect connection through an intermediary. For those of ordinary skill in the art, the specific meanings of the above terms in the utility model can be understood on a case-by-case basis.

Figure 1:
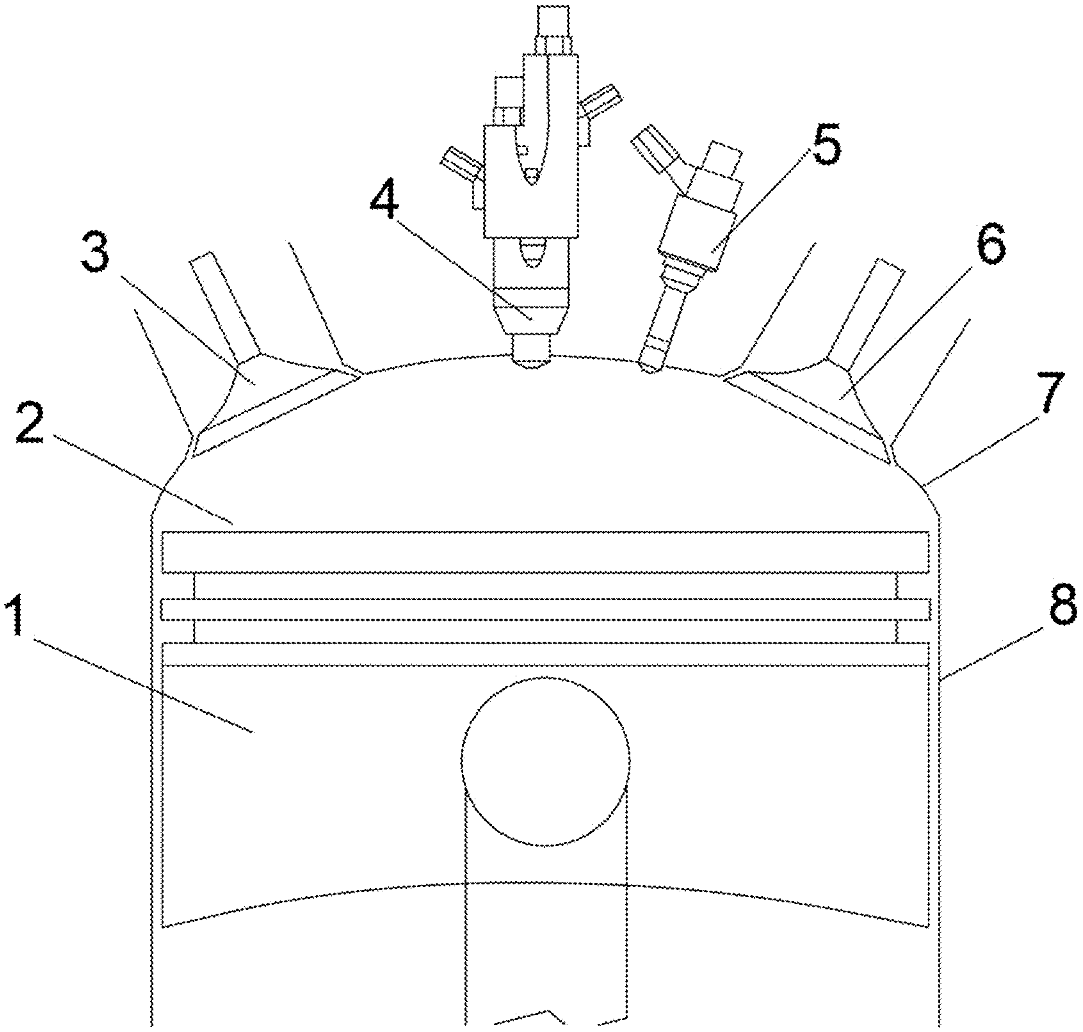
FIG. 1 is a sectional view of an ammonia-rich fueled engine equipped with a reaction activity control jet ignition device based on oxygen enhancement.

As shown in FIG. 1, an ammonia-rich combustion ammonia-fueled engine with a reaction activity control prechamber based on oxygen enhancement is provided, including a jet ignition device 4, a piston 1, a cylinder head 7, a cylinder liner 8, an intake valve 3, an exhaust valve 6, and an ammonia gas injector 5. The jet ignition device 4, the intake valve 3, the exhaust valve 6 and the ammonia gas injector 5 are all arranged at the top of the cylinder head 7, and the jet ignition device 4 and the ammonia gas injector 5 are located between the intake valve 3 and the exhaust valve 6. A combustion chamber 2 is formed between the piston 1 and the cylinder head 7, and an end of the jet ignition device 4 and an end of the ammonia gas injector 5 extend into the combustion chamber 2.

Figure 2:
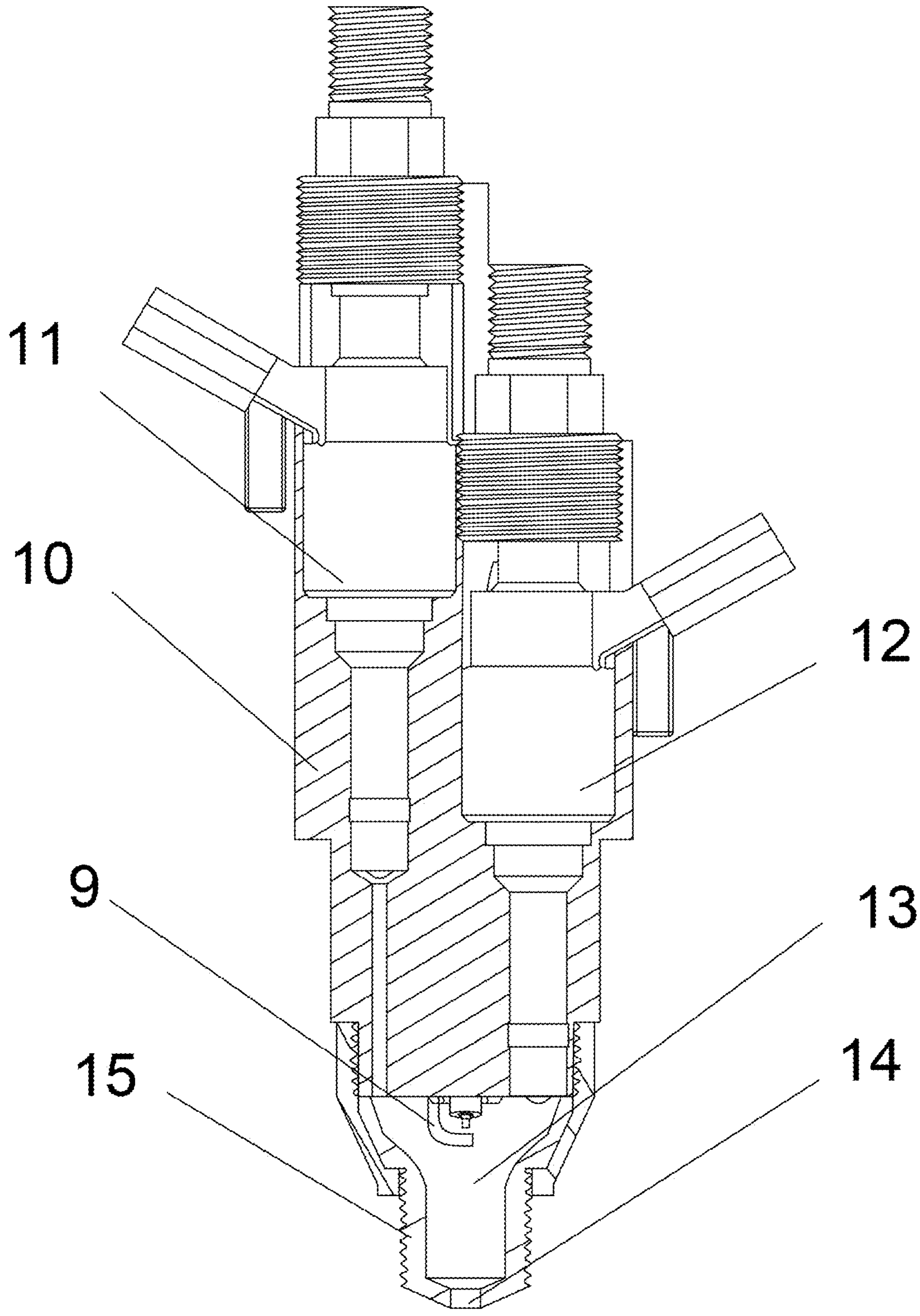
FIG. 2 is a sectional view of a reaction activity control jet ignition device based on oxygen enhancement.
Figure 3:
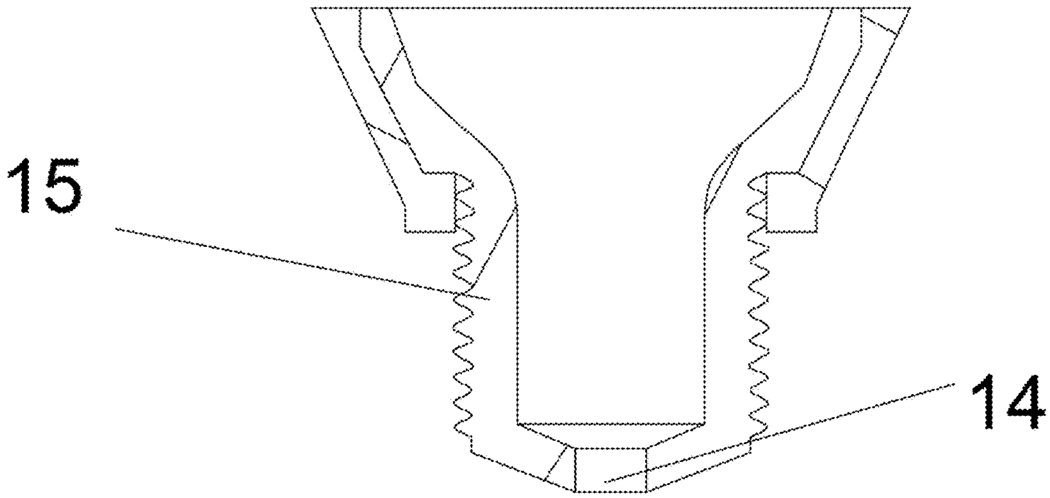
FIG. 3 is a structural diagram of a prechamber front end in FIG. 2.

As shown in FIG. 2 to FIG. 3, the jet ignition device 4 includes a shell 10 and a prechamber front end 15. The shell 10 and the prechamber front end 15 are in threaded connection, and a cavity formed between the bottom of the shell 10 and an inner wall of the prechamber front end 15 is the prechamber inner cavity 13. Threads are provided on an outer wall of the prechamber front end 15 for threaded connection to the cylinder head 7. A jet hole 14 is provided on the bottom of the prechamber front end, communicating the prechamber inner cavity 13 with the combustion chamber 2. An oxygen injector 11 and a fuel injector 12 are arranged in the shell 10, and injection ports of the oxygen injector 11 and the fuel injector 12 extend into the prechamber inner cavity 12. The spark plug 9 is located in the prechamber inner cavity 13, and is fixedly arranged at the bottom of the shell 10. The spark plug is located between the injection ports of the oxygen injector 11 and the fuel injector 12.

The oxygen injector 11 is configured to inject oxygen gas into the prechamber inner cavity 13 to reduce a concentration of a gas mixture in the prechamber inner cavity 13. The fuel injector 12 is configured to inject ammonia fuel or other high-reaction activity fuel into the prechamber inner cavity 13 to form a target gas mixture in the prechamber inner cavity 13.

When installing the jet ignition device 4, the oxygen injector 11, the fuel injector 12 and the spark plug 9 are installed on the shell 10. Corresponding threads are provided on part of a sidewall of the shell 10 (close to the prechamber front end 15) and part of an inner wall of the prechamber front end 15 to connect the shell 10 and the prechamber front end 15 with threads. Subsequently, the jet ignition device 4 is threaded onto the cylinder head 7 through threads on an outer wall of the prechamber front end 15. When the jet hole 14 in the prechamber front end 15 is damaged, the prechamber front end 5 can be rapidly replaced, and the replacement efficiency is improved. Moreover, the parameters, such as the volume and structure, of the prechamber inner cavity 13, and the parameters, such as the diameter and amount of the jet hole 14 are all flexible and adjustable, and an optimal prechamber structure can be selected according to the engine type and operating conditions without changing the engine structure.

A specific process of an ammonia-rich combustion mode of the ammonia-fueled engine is as follows:

During the operation of the ammonia-fueled engine, the ammonia gas injector 5 injects ammonia fuel into the combustion chamber 2 to form a concentrated ammonia-air mixture with an equivalence ratio of 1.0-1.2 in the combustion chamber 2.

During the compression stroke, the piston 1 moves upwards, due to the compression of the piston 1, ammonia in the combustion chamber 2 enters the prechamber inner cavity 13 through the jet hole 14. In order to improve the reaction activity of the concentrated ammonia/air mixture in the prechamber inner cavity 13 and further promote ignition combustion, before the spark plug 9 ignites, the oxygen injector 11 injects oxygen gas into the prechamber 13 to reduce an ammonia concentration in the gas mixture in the prechamber 13 to form a gas mixture with high reaction activity in the prechamber inner cavity 13. The specific oxygen injection amount of the oxygen injector 11 can be determined according to the operating conditions of the engine, thus generating prechamber jet flames with different intensities.

The spark plug 9 sparks over close to the compression top dead center to ignite the gas mixture in the prechamber inner cavity 13, so as to form an initial flame kernel. The initial flame kernel develops in the prechamber inner cavity 13 and forms a jet flame under the action of the jet hole 14, and then over-concentrated ammonia-air mixture in the combustion chamber 2 is ignited to complete the combustion work of the engine.

The ammonia gas/air mixture in the combustion chamber 2 is formed in the combustion chamber 2 along with the upward movement of the piston 1, wherein a chemical equivalence of ammonia fuel and oxygen can be controlled by the ECU of the engine, and a thermodynamic environment with a fuel-air equivalence ratio greater than 1 is achieved in the combustion chamber 2.

Therefore, even when the ammonia in the combustion chamber 2 is too rich, the stable ignition in the prechamber and the stability of initial flame propagation can be ensured, thereby igniting over-concentrated ammonia-air mixture 16 in the combustion chamber 2 to achieve ammonia-rich combustion and reduce NOx emission.

In the prior art, due to the existence of over-concentrated ammonia/air mixture in the prechamber, the speed and intensity of the jet flame in the prechamber is reduced. Therefore, the gas mixture in the prechamber is diluted by injecting oxygen gas into the prechamber inner cavity 13 using the oxygen injector 11, and meanwhile, the reaction activity of the gas mixture is improved, and the temperature and speed of the jet flame in the prechamber are ultimately improved. A high-intensity jet flame is generated in the combustion chamber 2 to promote the combustion of the gas mixture in the combustion chamber 2.

In conclusion, according to the ammonia-rich combustion ammonia-fueled engine based on oxygen-enhanced reaction activity control prechamber provided by the present disclosure, the jet temperature and jet speed of the prechamber are improved by injecting oxygen gas into the prechamber, and the reaction activity and jet intensity of the prechamber are flexibly adjustable by combining a detachable prechamber front end structure. Meanwhile, the NOx generated by in-cylinder combustion is reduced to nitrogen by the reducibility of ammonia under a working condition of ammonia-rich fuel, thus achieving low NOx combustion process and further reducing the NOx emission of the ammonia-fueled engine. A combustion strategy of a prechamber jet ignition ammonia-fueled engine based on controllable reaction activity is provided, which can achieve low NOx combustion by coupling a prechamber jet ignition device and in-cylinder combustion mode control.

In addition, it should be understood that although this specification is described in terms of embodiments, it does not mean that each embodiment only includes an independent technical solution. Foregoing narrative way in the specification is only for clarity. Those skilled in the art should take this specification as a whole. The technical solutions in the embodiments may also be properly combined to form other embodiments capable of being understood by those skilled in the art.

What is claimed is:

1. An ammonia-fueled engine based on oxygen enhancement, comprising a jet ignition device (4), a piston (1), a cylinder head (7), a cylinder liner (8), and an ammonia gas injector (5), wherein a combustion chamber (2) is formed between the piston (1) and the cylinder head (7), and an end of the jet ignition device (4) and an end of the ammonia gas injector (5) extend into the combustion chamber (2); the jet ignition device (4) comprises a prechamber inner cavity (13), a spark plug (9), an oxygen injector (11), and a fuel injector (12); the spark plug (9) is located in the prechamber inner cavity (13), injection ports of the oxygen injector (11) and the fuel injector (12) extend into the prechamber inner cavity (13); and the oxygen injector (11) is configured to inject oxygen gas into the prechamber inner cavity (13) to reduce a concentration of a gas mixture in the prechamber inner cavity (13).

2. The ammonia-fueled engine based on oxygen enhancement according to claim 1, wherein the jet ignition device (4) comprises a shell (10) and a prechamber front end (15); the shell (10) and the prechamber front end (15) are in detachable connection, and a cavity formed between a bottom of the shell (10) and an inner wall of the prechamber front end (15) is the prechamber inner cavity (13), a jet hole (14) is provided on the bottom of the prechamber front end (15), for communicating the prechamber inner cavity (13) with the combustion chamber (2), and threads are provided on partial outer wall of the prechamber front end (15) for threaded connection to the cylinder head (7) of an engine.

3. An ammonia-rich combustion control method of the ammonia-fueled engine based on oxygen enhancement according to claim 2, comprising the following steps:

during operation of an ammonia-fueled engine, injecting, by an ammonia gas injector (5), ammonia fuel into a combustion chamber (2) to form a concentrated ammonia-air mixture with an equivalence ratio of 1.0-1.2 in the combustion chamber (2);

during a compression stroke, due to the compression of a piston (1), enabling ammonia gas in the combustion chamber (2) to enter a prechamber inner cavity (13) through a jet hole (14);

before a spark plug (9) ignites, injecting, by an oxygen injector (11), oxygen gas into the prechamber inner cavity (13) to reduce an ammonia concentration in a gas mixture in the prechamber inner cavity (13); and at a position close to compression top dead center, igniting, by the spark plug (9), the gas mixture in the prechamber inner cavity (13) to form a jet flame through the jet hole (14), and then igniting a concentrated ammonia-air mixture in the combustion chamber (2) to complete combustion work of an engine.

4. The ammonia-rich combustion control method of the ammonia-fueled engine based on oxygen enhancement according to claim 3, wherein oxygen injection quantity of the oxygen injector (11) is determined according to an operating condition of the engine, so as to generate pre-chamber jet flames with different intensities.

5. The ammonia-rich combustion control method of the ammonia-fueled engine based on oxygen enhancement according to claim 3, wherein ammonia injection quantity of the ammonia gas injector (5) is regulated and controlled by an ECU (electronic control unit) of the engine, and a thermodynamic environment with a fuel-air equivalence ratio greater than 1 is achieved in the combustion chamber (2).

6. The ammonia-rich combustion control method of the ammonia-fueled engine based on oxygen enhancement according to claim 3, wherein the volume and structure of the prechamber inner cavity (13) and a diameter and amount of the jet hole (14) are selected according to an engine type and the operating condition.

* * * * *